United States Patent [19]

Ettl et al.

[11] Patent Number: 6,078,900
[45] Date of Patent: Jun. 20, 2000

[54] METHOD FOR ESTIMATING STOCK LEVELS IN PRODUCTION-DISTRIBUTION NETWORKS WITH INVENTORY CONTROL

[75] Inventors: Markus Ettl, Ossining; Grace Yuh-Jiun Lin, Chappaqua, both of N.Y.

[73] Assignee: International Business Machines Corporation, Armonk, N.Y.

[21] Appl. No.: 09/177,766

[22] Filed: Oct. 23, 1998

[51] Int. Cl.$^7$ ................................................ G06F 153/000
[52] U.S. Cl. ................................ 705/28; 705/10; 705/22; 364/468.03; 364/468.09
[58] Field of Search .................... 705/10, 22, 8, 705/28; 364/468.03, 468.09

[56] References Cited

U.S. PATENT DOCUMENTS

| | | | |
|---|---|---|---|
| 5,128,861 | 7/1992 | Kagami et al. | 705/10 |
| 5,168,445 | 12/1992 | Kawashima et al. | 705/10 |
| 5,237,496 | 8/1993 | Kagami et al. | 705/10 |
| 5,819,232 | 10/1998 | Shipman | 705/8 |
| 5,953,707 | 9/1999 | Huang et al. | 705/10 |

OTHER PUBLICATIONS

H. Lee, et al. "Material management in decentralized supply chains," *Operations Research*, 41, 835–847, 1993.

P. Glasserman, et al., "Sensitivity analysis of base–stock levels in multitechelon production–inventory systems," *Management Science*, 41, 163–281, 1993.

E.A. Silver, et al. "Decision Systems for Inventory Management and Production Planning," *John Wiley & Sons*, New York 2nd Ed., 1985.

W.J. Hopp, et al., "Factory Physics", *Irwin*, 1996.

R.J. Tersin, Principles of Inventory and Materials Management, *Prentice Hall*, Englewood Cliffs, 4th Ed., 1994.

J.A. Buzacott, et al. "Stochastic Models of Manufacturing Systems", *Prentice Hall*, Englewood Cliffs, 1993.

*Primary Examiner*—Tod R. Swann
*Assistant Examiner*—Jagdish Patel
*Attorney, Agent, or Firm*—Scully, Scott, Murphy & Presser; Stephen C. Kaufman, Esq.

[57] ABSTRACT

A method resolves the problem of projecting future stock levels for multiple stockholding locations in production-distribution networks, and minimizing the total dollar delinquency within given inventory budgets or within given allowable inventory holding costs. The invention communicates process control parameters and production-distribution network parameters, computes priorities for each product held at retail locations of the distribution network. It allocates available global and local budgets among products, sets starting stock levels for each product, computes and displays stock levels and the distribution network performance measures.

14 Claims, 6 Drawing Sheets

METHOD FOR ESTIMATING STOCK LEVELS IN PRODUCTION-DISTRIBUTION NETWORKS WITH INVENTORY CONTROL

BACKGROUND OF THE INVENTION

1. Field of the Invention

The present invention relates to computer software for business management and, more specifically, to a computer implemented method for estimating stock levels in production-distribution networks with inventory control.

2. Description of Prior Art

The manufacturing of computers, consumer electronics, or high-technology electronic devices are growing industries with rapidly changing production processes that require multiple stockholding points. One of the great challenges in such an environment is a company's ability to meet end-customer demand while facing demand and technology uncertainties.

If inventories are managed successfully, rewards can be tremendous. However, the penalty for keeping too little stock goes beyond the cost of foregone revenue. It includes lost potential for additional business, loss of future design gains, and a drop of pricing leverage in the marketplace. The penalty for keeping too much stock includes opportunity cost of financing additional inventory and severely reduced profit margins caused by rapidly declining prices in the technology market.

A production-distribution network consists of a collection of manufacturing sites, warehouses, distribution centers, and retailers through which products flow on their way from manufacturer to the final customer. The key management challenge that high-technology industries are facing is to determine where and in what quantities to hold safety stock in the network so as to protect against uncertainties, and to ensure that target customer service levels are met. Aggressive service level targets require significant inventory planning, given the mix of build-to-stock and build-to-order products reflected in most company's portfolios. Such inventories are subject to high-countervailing costs and to overall inventory budget constraints. Today, the determination of inventory levels is localized and often ad hoc, and not based on an analysis of optimal levels and deployment. As a result, the business impact, in terms of the trade-off between inventory investment and customer serviceability or delinquency, is far from being well understood.

Determining the optimal values of inventory levels in multi-stage production-distribution networks is extremely difficult, and few real-world inventory management systems have the capability to accurately predict target stock levels. The difficulty of the problem arises from the fact that the quantity of safety stock held at one stocking location, and the policy determining replenishment of inventory at that location, will affect other stockholding locations in the network. Management systems are needed that have the capability to accurately represent the interdependencies of all links in a production-distribution network, and that allow planners to quantify the impact of decisions on inventory management at one location on other participants in the network.

Computational methods that address the problem of how to allocate safety stock in a production-distribution network are largely unavailable, although some effort has been expended into obtaining quantitative performance models for such systems.

H. Lee and C. Billington in "Material Management in Decentralized Supply Chains," Operations Research, 41, 835–847, 1993, develop an approximate method to estimate the performance of production-distribution networks with base-stock controls. A simulation-based approach to obtain gradient information with respect to base-stock levels in a multi-stage production-distribution system is discussed by P. Glasserman and S. Tayur in "Sensitivity Analysis of Base-stock Levels in Multiechelon Production-inventory Systems," Management Science, 41, 263–281, 1993.

A method to quantitatively assess inventory-service level tradeoffs in production-distribution networks with base-stock control is described in commonly owned, co-pending U.S. patent application Ser. No. 08/625,455, which is herewith incorporated by reference. The method captures the interdependence of safety stock levels at different stocking locations as well as their effect on overall system performance. It is to be used for both performance evaluation and optimization. In the former case, the user specifies the base-stock level for every stocking location in the network, and the method estimates end-customer service levels and the average dollar value of inventory held in the network. In the case of optimization, a constrained non-linear optimization problem is formulated which minimizes the average total dollar value of inventory in the network, subject to supporting desired customer service level targets. The optimization is carried out using a software package implementing a conjugate gradient search method. Additionally, U.S. patent application Ser. No. 08/625,455 describes a performance evaluation method.

For descriptions of the base-stock control policy as well as examples of how it is used, refer to E. A. Silver and R. Peterson, "Decision Systems for Inventory Management and Production Planning," Wiley, New York 2nd. Ed., 1985; W. J. Hopp and M. L. Spearman, "Factory Physics," Irwin, 1996; and R. J. Tersine, "Principles of Inventory and Materials Management," Prentice Hall, Englewood Cliffs, 4th. Ed., 1994. Descriptions and examples of other decentralized inventory control systems can be found in J. A. Buzacott and J. G. Shanthikumar, "Stochastic Models of Manufacturing Systems," Prentice Hall, Englewood Cliffs, 1993.

What is needed is a system for providing a general framework for inventory management in production-distribution networks in the presence of constrained capital budgets which possesses the following features:

1. it can be implemented in conjunction with any given inventory control policy;
2. the framework supports the use of simulation-based or analytical methods to evaluate the performance of a given production-distribution network;
3. it does not require dedicated software to carry out the optimization process; and
4. it allows to factor real-world requirements such as inventory budget constraints, projected dollar delinquencies, or pre-defined product stockholding levels in its calculations.

SUMMARY OF THE INVENTION

This invention implements a framework for a corporate inventory management system. The system determines stocking levels in production-distribution networks that operate under a given inventory control mechanism. It aims at minimizing the total projected dollar delinquency for a given global inventory budget constraint, or a given set of local capital investment constraints.

Examples of inventory control mechanisms that are well-established and can be implemented in conjunction with the framework developed in this invention are base-stock control, (s,S) inventory control, PAC inventory control, Constant Work-In-Process (CONWIP), and kanban control.

The system presented in this invention accurately models the effect of upstream stockholding levels on downstream stockholding levels and overall customer serviceability. It has the ability to perform single-stage or multi-stage optimization. The system optimizes simultaneously across any given set of stockholding locations in a production-distribution network using a novel priority-based safety stock allocation approach. It allows the integration of real-world management constraints into its calculations in that it accommodates manual overrides of system decisions, such as serviceability or selected product stockholding levels. The computations are easy to implement and execute on various hardware platforms, such as a system of LAN-connected personal computers, network computers, workstations, or dedicated computer systems.

The invention is a method for estimating safety stock levels of products in a production-distribution network of at least one warehouse and multiple retail locations. The invention communicates process control parameters and production-inventory network parameters, computes priorities for each product held at retail locations of the production-distribution network. It allocates available global and local budgets among products in the network, sets starting stock levels for each product, computes and displays stock levels and distribution network performance measures.

The invention presents a problem of estimating stock levels as a mathematical optimization problem with two sets constraints, one fixed and one variable. The variable constraint allows for various approaches to computation of stock levels. Any of these approaches may be used to compute stock levels.

BRIEF DESCRIPTION OF DRAWINGS

The foregoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF THE INVENTION

Assuming that each product in the network is managed according to a base-stock policy, the present invention will be described by first defining the notation to be used and providing the mathematical description of the problem under consideration. However, it shall be understood that the invention is not limited to production-distribution networks that operate under any one particular inventory control policy. The base-stock control is used solely for illustrative purposes and is not intended as the inventory control policy of choice, any inventory control policy may be used in conjunction with the method of the present invention.

Figure 1:
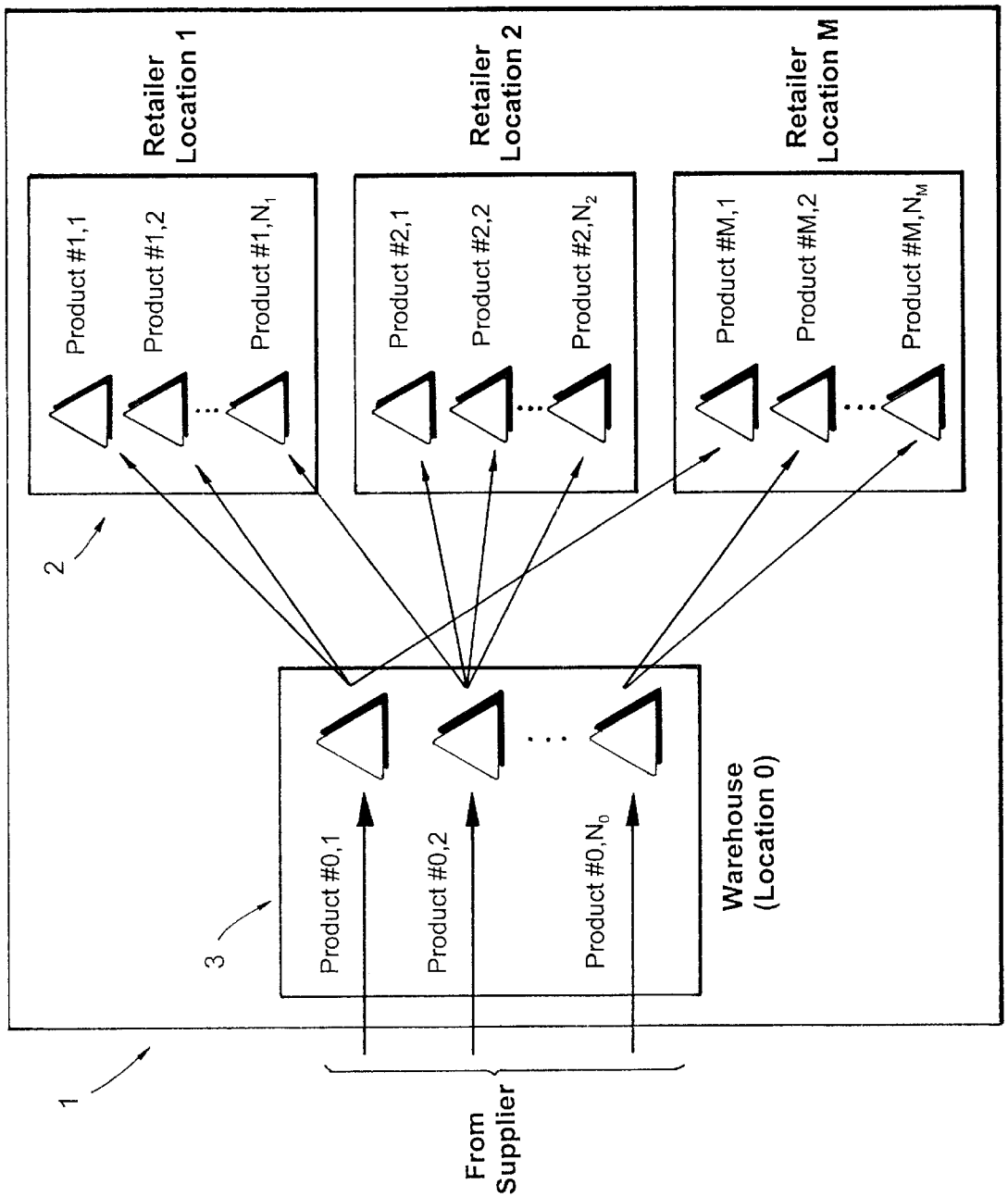
FIG. 1 is a diagram illustrating the material flow in a two-stage production-distribution network.

As shown in FIG. 1, a production-distribution system consists of a collection of manufacturing sites, warehouses, distribution centers, and retailers through which products flow on their way from the supplier to the final customer. The network 1 is a two-stage system that consists of M retailer locations 2 supplied by one warehouse 3. The retailers obtain replenishment from the warehouse, which in turn obtains replenishment from a supplier. Such networks can be found in manufacturing and distribution of high-technology devices such as the semiconductor industry, where the warehouse may store different types of wafers which are made available to end-customers through retail channels.

The following notation shall be used to mathematically formulate the optimization problem:

M number of retailer locations in production-distribution network.

$N_0$ number of products at a warehouse.

$N_i$ number of products at retailer location i, i=1,2, . . . ,M.

$h_{ij}$ inventory cost (or holding cost) per unit for product j at retailer location i, i=1,2, . . . ,M and j=1,2, . . . ,$N_i$.

$s_{ij}$ shortage cost per unit for product j at retailer location i, i=1,2, . . . ,M and j=1,2, . . . ,$N_i$.

$x_{ij}$ base-stock level for product j at location i, i=0,1, . . . M and j=1,2, . . . ,$N_i$.

$x_{ij}^{min}$ minimum base-stock level for product j at location i, i=0,1, . . . ,M and j=1,2, . . . ,$N_i$.

$x_{ij}^{max}$ maximum base-stock level for product j at location i, i=0,1, . . . ,M and j=1,2, . . . ,$N_i$.

x vector of base-stock levels x=($x_{01}$, $x_{02}$, . . . $x_{MN_M}$).

$b_{ij}$ (x) expected number of back orders for product j at location i, i=0,1, . . . ,M and j=1,2, . . . ,$N_i$.

$c_{ij}$ (x) inventory budget allocated to product j at location i, i=0,1, . . . ,M and j=1,2, . . . $N_i$.

$p_{ij}$ priority of product j at retailer location i, i=1,2, . . . ,M and j=1,2, . . . ,$N_i$.

$\mu_{ij}$ average demand over actual lead time for product j at retailer location i, i=1,2, . . . ,M and j=1,2, . . . $N_i$.

$\sigma_{ij}$ standard deviation of demand over actual lead time for product j at retailer location i, i=1,2, . . . ,M and j=1,2, . . . $N_i$.

The management objectives and constraints are defined in terms of customer serviceability and inventory. The purpose is to restrict the total inventory capital investment to a certain level and to find a base-stock policy which deploys inventory to stocking locations so that the projected dollar delinquency is at a minimum. A multi-stage approach is used to determine a policy that minimizes the average dollar delinquency as measured by customer requested date or by promised ship date. At the same time, it takes into consideration a predefined inventory budget or a total allowable inventory holding cost budget.

Mathematically, the optimization problem can be stated according to equation 1, as follows:

$$\min G(x) = \sum_{i=1}^{M} \sum_{j=1}^{N_i} s_{ij} b_{ij}(x) \qquad (1)$$

and is subject to two sets of constraints. The first set of constraints stated according to equation 2 as follows:

$$x_{ij}^{min} \leq x_{ij} \leq x_{ij}^{max}, \text{ for } i=0,1 \ldots ,M \text{ and } j=1,2 \ldots ,N_i, \qquad (2)$$

imposes upper and lower bounds on the base-stock level, and thus the amount of safety stock inventory, that may be held at any stockholding location.

The second set of constraints is stated according to equation 3 as follows:

$$0 \leq \sum_{i=0}^{M} \sum_{j=1}^{N_i} c_{ij}(x) \leq C, \quad (3)$$

where C denotes the maximum inventory or holding cost budget for all stockholding locations in the production-distribution network, imposes an upper bound on the total inventory, i.e., it restricts inventory that is being held at the warehouse and the retailers to a maximum level. The problem above formulated as min G(x) is identified by equations 1–3, and is hereinafter referred to as Problem I.

Next, consider the problem of determining inventory levels in the case where distinct inventory budgets are being imposed on the warehouse and the retailers. For this purpose, the second set of constraints of Problem I, given as equation 3, is replaced by a new set of constraints stated according to equation 4 as follows:

$$0 \leq \sum_{j=1}^{N_0} c_{0j}(x) \leq C_0 \quad \text{and} \quad 0 \leq \sum_{i=1}^{M} \sum_{j=1}^{N_i} c_{ij}(x) \leq C_r, \quad (4)$$

where $C_0$ denotes the maximum inventory or holding cost budget for the upstream stockholding location, i.e., the warehouse 3, and $C_r$ denotes the maximum inventory or holding cost budget for the downstream stockholding locations, i.e., the retailers 2. This formulation of the problem is hereinafter referred to as Problem II.

Further, consider the problem of determining inventory levels for the case that distinct inventory budgets are being imposed on the warehouse and each retail location. For this purpose the second set of constraints of Problem I or Problem II is replaced by the set of constraints stated according to equation 5 as follows:

$$0 \leq \sum_{j=1}^{N_i} C_{ij}(x) \leq C_i, \quad \text{for} \quad i = 0, 1, \ldots, M, \quad (5)$$

where $C_i$ denotes the maximum inventory or holding cost budget for stockholding location i, i=0,1, . . . ,M. This formulation of the problem is hereinafter referred to as Problem III.

Processing

Figure 2:
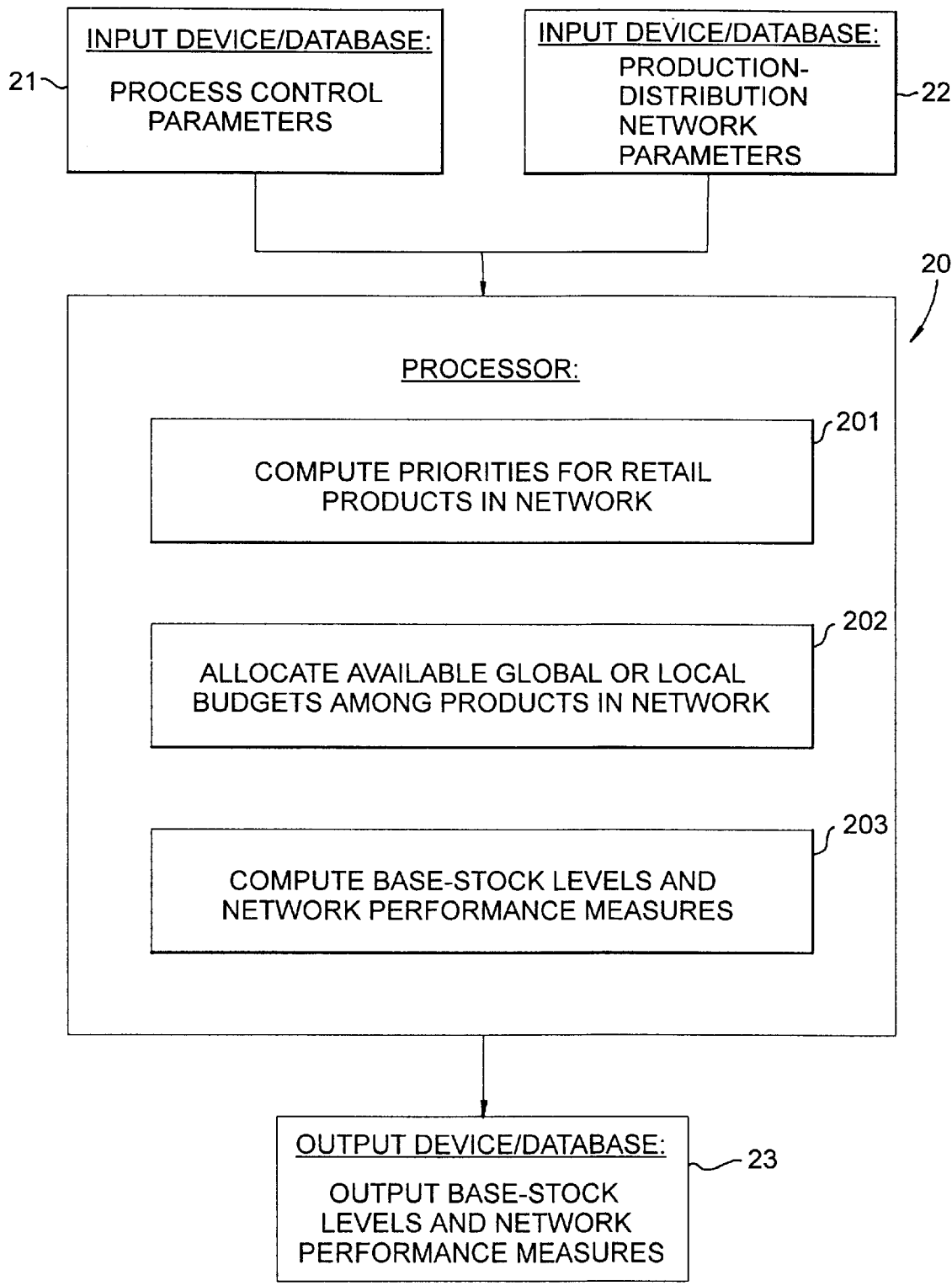
FIG. 2 is a block diagram representing an example of a hardware platform on which the invention may be implemented.

FIG. 2 shows a computer implementation of the invention. The processor 20 receives process control parameters as inputs from a first input device database 21 and production-distribution network parameters from a second input device database 22. These devices are typically direct access computer storage devices (DASD) which store respective databases.

The processor 20 may be programmed to calculate a priority for every product held at a retail location in the production-distribution network by executing routine 201, followed by allocating the available safety stock budget among all stockholding locations in the network according to priorities by executing routine 202. Finally, the processor 20 may compute base stock levels and network performance measures by performing functions of routine 203. The conclusion of the processing by processor 20 is the output of the optimal configuration which may be sent to an output device database 23. The output may be written to a DASD in the computer which stores the output in a database, or to other devices such as a terminal display or a printer.

Figure 3:
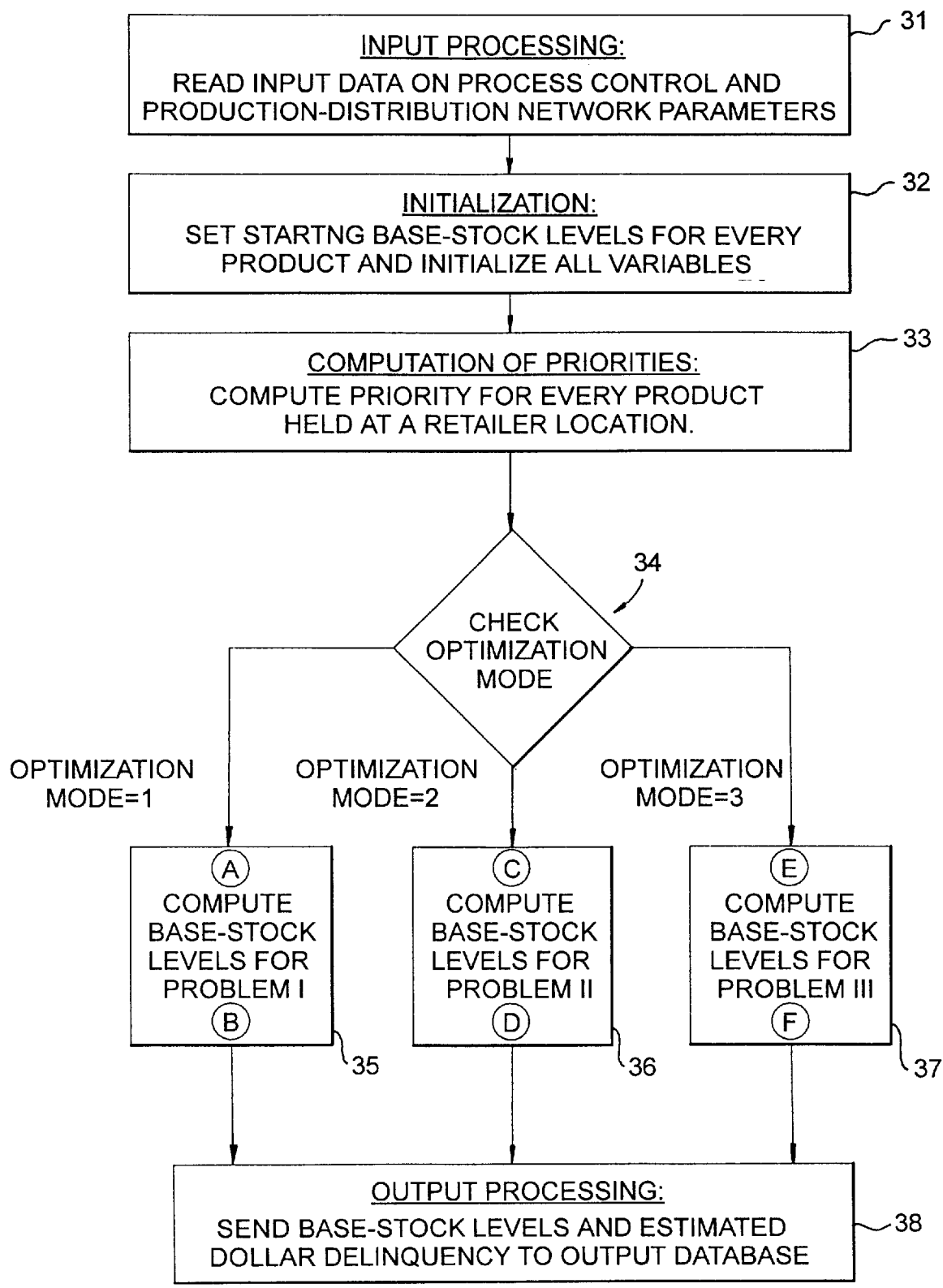
FIG. 3 is a flow diagram illustrating the logic of the overall process of the computer algorithm implemented by the invention.

FIG. 3 shows an in-depth flow of processing steps implemented by the processor 20 (FIG. 2). The processing commences when the input data on process control and the production-distribution network is read from the input databases at an input processing routine 31. An exemplary pseudo code listing for step 31 is shown in Table 1.

TABLE 1

| Input Processing: |
|---|
| #define INFINITY 1.0e20<br>#define MAXITER 50<br>read M from input database;<br>for i=0 to M do<br>  read $N_i$ from input database;<br>end for<br>for i=0 to M and j=1 to $N_i$ do<br>  read $s_{ij}, h_{ij}, x_{ij}^{min}, x_{ij}^{max}$ from input database;<br>end for<br>read OptMode from input databases;/*OptMode denotes optimization mode; based on its value, the user defines whether Problem I, Problem II, or Problem III is to be solved */<br>if OptMode==1 do/*read optimization parameters for Problem I*/<br>  read C from input database;     /*read maximum total inventory or holding cost budget*/<br>  read B from input database;     /*read monetary bucket size*/<br>end if<br>if OptMode==2 do /*read optimization parameters for Problem II*/<br>  read $C_0$ and $C_r$ from input database; /*read maximum inventory or holding cost budget for warehouse and retail locations*/<br>  read $B_0$ and $B_r$ from input database;   /*read monetary bucket size for warehouse and retail locations*/<br>end if<br>if OptMode == 3 do     /*read optimization parameters for Problem III*/<br>for i=1 to M do<br>  read $C_i$ from input database;     /*read maximum inventory or holding cost budget for location i*/<br>  read $B_i$ from input database;/*read monetary bucket size for location i/*<br>end for<br>end if |

Then, the base-stock levels of every stocking location in the network is initialized to its lower bound as specified in the input data by the initialization routine 32. An exemplary pseudo code listing for step 32 is shown in Table 2.

TABLE 2

Initialization:

```
for i=0 to M and j=1 to N_i do
X_ij=X_ij^min ; /* set initial base-stock for each stocking location to its
              lower bound */
end for
for i = 1 to M and j = 1 to N_i do
compute mean demand over actual lead time μ_ij and standard deviation of
demand over actual lead time σ_ij according to method described com-
monly
owned, co-pending U.S. patent application Ser. No. 08/625,455.
end for
initialize all other variables to zero;
```

Then a priority for every product held at a retailer location is determined by computation of priorities routine 33. The priority of a product is based on its component price, shortage cost, and the coefficient of variation of demand over the lead time associated with that product. The process starts with two nested loops which cause the processing to compute a weight coefficient $\omega_{ij}$ for product j at retailer location i. The weight coefficients are calculated according to equation 6 as follows:

$$\omega_{ij} = \frac{s_{ij}}{h_{ij}} f_{ij}, \quad \text{for } i = 1, 2, \ldots, M \text{ and } j = 1, 2, \ldots, N_i, \quad (6)$$

where $f_{ij} = \sigma_{ij}/\mu_{ij}$ denotes the coefficient of variation of demand over the lead time for product j at retailer location i.

The highest priority is then assigned to the product with the largest weight coefficient. The second highest priority is assigned to the product with the next largest weight coefficient, etc. This process continues until a unique priority has been assigned to every product held at a retailer location. By incorporating the coefficient of variation of demand over the lead time into the computations of the weight coefficients, the method allows to differentiate between products having a stable demand pattern and products having more volatile demand patterns. Given that two products maintain the same cost structure, a product with higher demand uncertainty is assigned a higher priority, and thus receives preference in the process of safety stock allocation. An exemplary pseudo code listing for step 33 is shown in Table 3.

TABLE 3

Computation of Priorities:

```
/* compute priority for each finished goods product based on its
unit inventory cost, shortage cost, and coefficient of variation of
demand over actual lead time; priority 1 is highest */
for i = 1 to M and j = 1 to N_i do
compute weight coefficient ω_ij according to the weight coefficients
equation
end for
for k = 1 to N_1 + N_2 + . . . + N_M do
ω*= -1;
i*= 0;
```

TABLE 3-continued

Computation of Priorities:

```
j*= 0;
for i=1 to M and j=1 to N_i do
if ω_ij >ω* do
ω*=ω_ij;
i*=i;
j*=j;
end if
end for
ω_i*j* = -1;/*reset weight assigned to finished goods product j* at
location i* */
P_i*j* = k;/*assign priority k to finished goods product j* at
location i* */
end for
```

A decision block 34 causes the process flow to branch into one of three function blocks 35, 36 or 37 implementing the optimization problem stated above with different constraints. The processing of steps 35, 36 and 37 is shown in respective FIGS. 4, 5 and 6.

Figure 4:
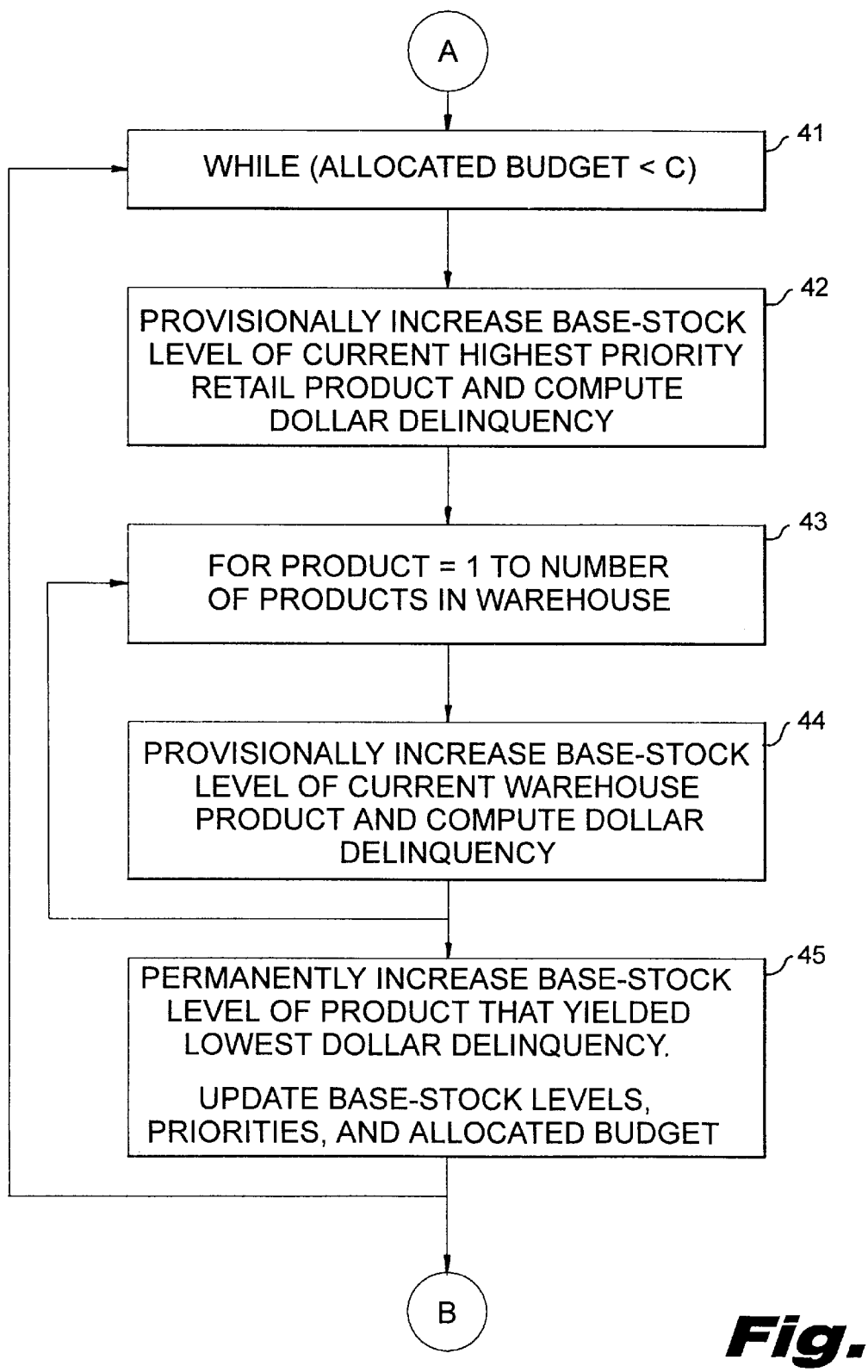
FIGS. 4 to 6 are the flow diagram of computations of various modes of optimization.

FIG. 4 shows the routine for computing safety stock levels under a global budget constraint in accordance with the equation 3 of Problem I. The process enters a loop controlled by decision block 41 which causes the processing to be performed until the available budget has been consumed. Within this loop, the first step is to provisionally increase the safety stock, and thus the base-stock level, of the product with the current highest priority in process step 42.

The current highest priority is initialized to one, and is incremented with every iteration. The safety stock is to be increased in increments of a common monetary bucket size which can be a user input or can be set to a default value. Given this set of base-stock levels, the expected number of back orders is determined using the performance evaluation method described in commonly owned, co-pending U.S. patent application Ser. No. 08/625,455. Then, the estimated dollar delinquency is computed according to above equation representing the optimization problem.

The process then enters a loop controlled by decision block 43 which causes processing to be performed for every product in the warehouse. Within the inner loop, the base-stock level of a product in the warehouse is provisionally increased, and the expected number of back orders as well as the estimated dollar delinquency are computed in process step 44. Once the processing of the inner loop is completed, the additional safety stock bucket is assigned permanently to the product which yielded the lowest dollar delinquency in process step 45.

Finally, the base-stock levels and the allocated budget are updated, and the control of the process resumes in decision block 41. An exemplary pseudo code listing for steps 41–45 is shown in Table 4.

TABLE 4

Computation of Base-Stock Levels for Problem I:

```
if OptMode == 1 do
if B<=0 do
B=C/(MAXITERATIONS* (N_0 + N_1 + . . . +N_M)) ;/*set default monetary bucket
size*/
end if
/* main loop: allocate safety stock budget in units of monetary
bucket size B until budget C is allocated */
while C>B do
if currentPriority <N_1 + N_2 +. . . +N_M do
current Priority = current Priority*1; else currentPriority = 1;
end if
G* = INFINITY;
i* = 0;
j* = 0:
/* provisonally increase safety stock of finished goods product with
priority "currentPriority" and compute objective function value */
for i = 1 to M and j = 1 to N_i do
if p_ij ==currentPriority do
x_ij = min (x_ij^max,x_ij+ B/h_ij); /* increase base-stock level */
for i = 1 to M and j = 1 to N; do
compute b_ij(x) according to method described commonly owned, co-
pending U.S. patent application Ser. No. 08/625,455.
end for
compute G(x) according to equation (1)
if G*>G(x) do
G* = G(x);
i* = i;
j* = j;
end if
x_ij= max (x_ij, x_ij − B/h_ij); reset base-stock level */
end if
end for
/* provisionally increase safety stock of every warehouse product and
compute objective function value */
for j = 1 to N_0 do
x_0j= min (x_0j^max,x_0j+ B/h_oj); /* increase base-stock level */
for i = 1 to M and j = 1 to N_i do
compute b_ij(x) according to method described commonly owned, co-
pending U.S. patent application Ser. No. 08/625,455.
end for
compute G(x) according to equation (1)
if G*>G(x) do
G* = G(x);
i* = i;
j* = j;
end if
x_0j= max (x_0j, x_0j − B/h_oj); /* reset base-stock level */
end for
/* assign new base stock-level to current best product and update
allocable budget value*/
x_i*j* = x_i*j*+ B/h_i*j*;
C = C − B/h_i*j*;
end while
end if
```

Figure 5:
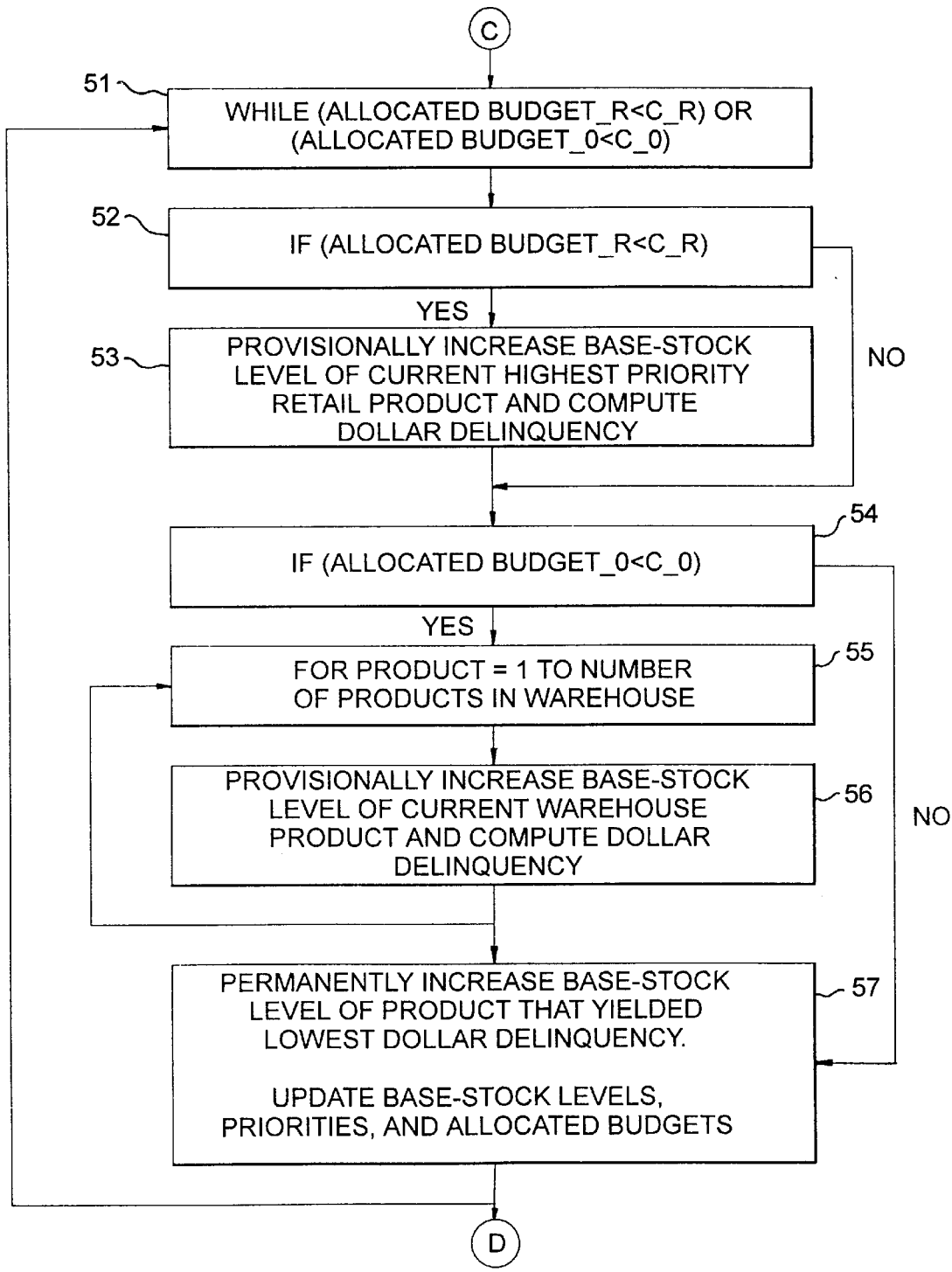

FIG. 5 shows the routine for computing of safety stock levels under a global budget constraint in accordance with the equation 4 of Problem II. The process enters a loop controlled by decision block 51 which causes the processing to be performed until the available budget for retail stores has been consumed, or the available budget for the warehouse has been consumed. Within this loop, the first step is to tentatively increase the safety stock, and thus the base-stock level, of the product with the current highest priority in process step 53. However, that step 53 will only be performed if the available budget for retail stores has not yet been consumed, which is determined in step 52.

The current highest priority is initialized to one, and is incremented with every iteration. The safety stock is to be increased in increments of a common monetary bucket size which can be a user input or can be set to a default value. Given this set of base-stock levels, the expected number of back orders is determined using the performance evaluation method described in commonly owned, co-pending U.S. patent application Ser. No. 08/625,455. Then, the estimated dollar delinquency is computed according to above equation representing the optimization problem.

The process then enters a loop controlled by decision block 54 which causes processing to be performed for every product in the warehouse. Within the inner loop, the base-stock level of a product in the warehouse is provisionally increased, and the expected number of back orders as well as the estimated dollar delinquency are computed in process step 56. However, step 57 will only be performed if the available budget for the warehouse has not yet been consumed, which is determined in step 54.

Once the processing of the inner loop is completed, the additional safety stock bucket is assigned permanently to the product which yielded the lowest dollar delinquency in process step 57. Finally, the base-stock levels and the allocated budget are updated, and the control of the process resumes in decision block 51. An exemplary pseudo code listing for steps 51–57 is shown in Table 5.

TABLE 5

Computation of Base-Stock Levels for Problem II:

```
if OptMode == 2 do
if B₀ <=0 do
B₀ = C₀/ (MAXITERATIONS * N₀); /* set default monetary bucket size for
downstream locations */
end if
/* main loop; allocate safety stock budget in units of monetary
bucket size B₀ and Bᵣ until budgets C₀ and Cᵣ are allocated */
while C₀>B₀ OR Cᵣ > Bᵣ do
if currentPriority < N₁ + N₂ + . . . + N_M do
currentPriority = currentPriority + 1; else currentPriority = 1;
end if
G* = INIFINITY
i* = 0;
j* = 0;
/* provisionally increase safety stock of retail product with
priority "currentPriority" and compute objective function value */
for i=1 to M and j=1 to Nᵢdo
if pᵢⱼ ==currentPriority AND Cᵣ > Bᵣ do
xᵢⱼ= min(xᵢⱼᵐᵃˣ,xᵢⱼ + Bᵣ/hᵢⱼ); /* increase base-stock level */
for i=1 to M and j=1 to Nᵢ do
compute bᵢⱼ (x) according to method described commonly owned, co-
pending U.S. patent application Ser. No. 08/625,455.
end for
compute G(x) according to equation (1)
if G* > G(x) do
G* = G(x);
i* = i;
j* = j;
end if
xᵢⱼ= max(xᵢⱼ,xᵢⱼ − Bᵣ/hᵢⱼ); /* reset base-stock level */
end if
end for
/* provisionallyincreas safety stock of every warehouse product and
compute objective function value */
if C₀ > B₀ do
for j=1 to N₀ do
x₀ⱼ=min(x₀ⱼᵐᵃˣ,x₀ⱼ+ B₀/h₀ⱼ) ; /* increase base-stock level */
for i=1 to M and j=1 to N; do
compute bᵢⱼ (x) according to method described commonly owned, co-
pending U.S. patent application Ser. No. 08/625,455.
end for
compute G(x) according to equation (1)
if G* > G(x) do
G* = G(x);
i* = i;
j* = j;
end if
x₀ⱼ= max(x₀ⱼ, x₀ⱼ − B₀/h₀ⱼ); /* reset base-stock level */
end for
end if
/* assign new base stock-level to current best product and update
allocable budget values*/
if i* > 0 do
x_{i*j*}=x_{i*j*}+Bᵣ/h_{i*j*};
C₀ = C₀−B₀/h_{i*j*};
Cᵣ = Cᵣ−Bᵣ/h_{i*j*};
else
x_{i*j*}=x_{i*j*}+ B₀/h_{i*j*};
end if
end while
end if
```

Figure 6:
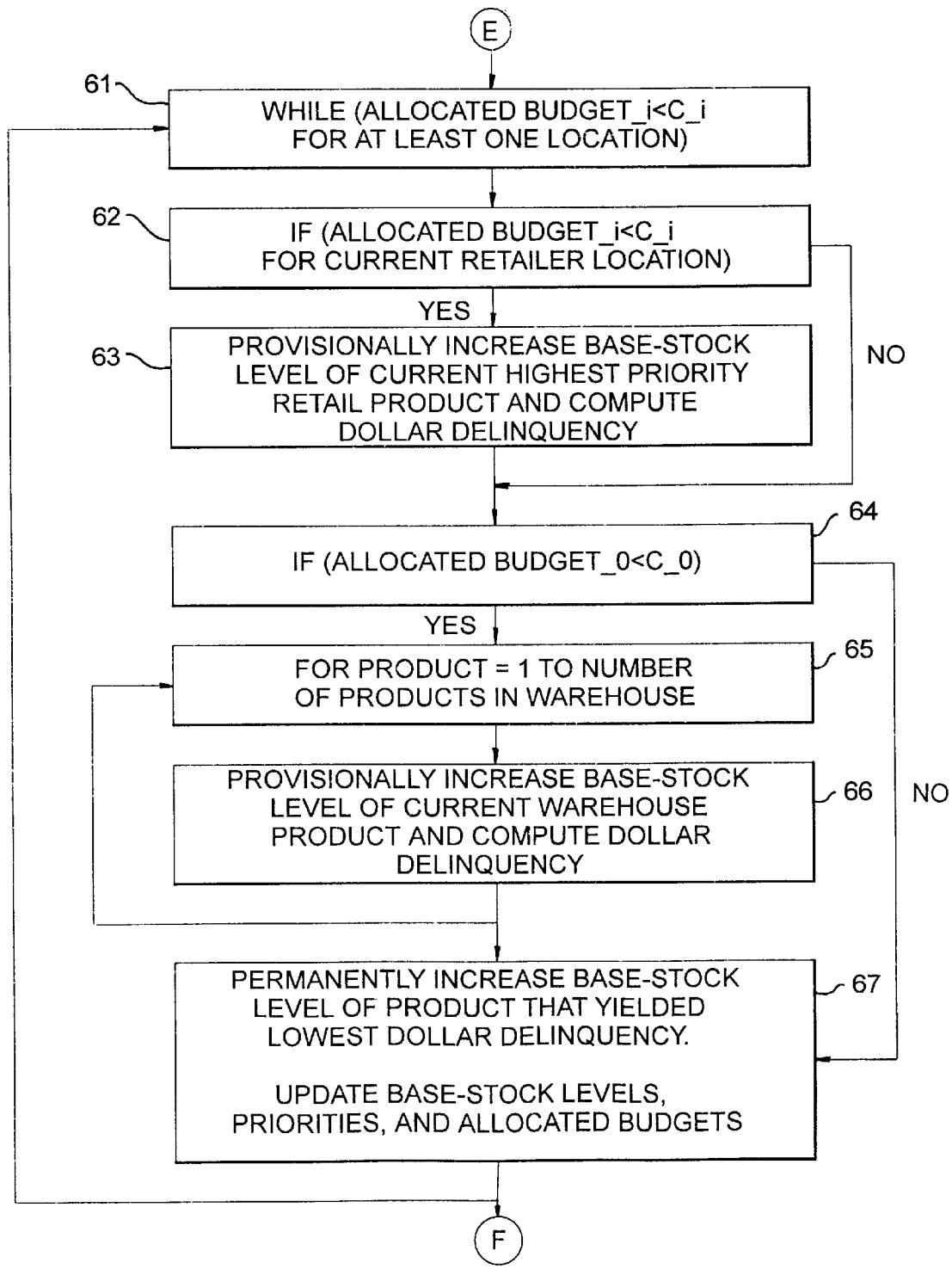

FIG. 6 shows the computation of safety stock levels under a global budget constraint in accordance with the equation 5 of Problem III. The process enters a loop controlled by decision block 61 which causes the processing to be performed until the available budget at all retail stores has been consumed. Within this loop, the first step is to provisionally increase the safety stock, and thus the base-stock level, of the product with the current highest priority in process step 63. However, that step 63 will only be performed if the available budget for a current retail store has not yet been consumed, which is determined in step 62.

The current highest priority is initialized to one, and is incremented with every iteration. The safety stock is to be increased in increments of a common monetary bucket size which can be a user input or can be set to a default value. Given this set of base-stock levels, the expected number of back orders is determined using the performance evaluation method described in commonly owned, co-pending U.S. patent application Ser. No. 08/625,455. Then, the estimated dollar delinquency is computed according to equation 1 representing the optimization problem.

The process then enters a loop controlled by decision block 64 which causes processing to be performed for every product in the warehouse. Within the inner loop, the base-stock level of a product in the warehouse is provisionally increased, and the expected number of back orders as well as the estimated dollar delinquency are computed in process step 66. However, step 66 will only be performed if the available budget for the warehouse has not yet been consumed, which is determined in step 65.

Once the processing of the inner loop is completed, the additional safety stock bucket is assigned permanently to the product which yielded the lowest dollar delinquency in process step 67. Finally, the base-stock levels and the allocated budget are updated, and the control of the process resumes in decision block 61. An exemplary pseudo code listing for steps 61–67 is shown in Table 6.

TABLE 6

Computation of Base-Stock Levels for Problem III:

```
if OptMode == 3 do
for i = 0 to M do
if B_i <=0 do
B_i = C_i (MAXITERATIONS*N_i); /* set default monetary bucket size for
location i */
end if
end for
/* main loop: allocate safety stock budget in units of monetary
bucket sizes B_i until budgets C_i are allocated */
while C_o> B_o OR C_1 > B_1 OR. . .OR C_M>B_M do
if currentPriority < N_1 + N_2 +. . .+N_M do
currentPriority = currentPriority+1; else currentPriority =1;
end if
G* = INFINITY;
i* = 0;
j* = 0;
/* provisionally increase safety stock of retail product with
priority "currentPriority" and compute objective function value */
for i=1 to M and j=1 to N_i do
if P_ij == currentPriority AND C_i > B_i do
x_ij= min(x_ij^max -,x_ij+ B_i/h_ij); /* increase base-stock level */
for i=1 to M and j=1 to N_i do
compute b_ij(x) according to method described commonly owned, co-
pending U.S. patent application Ser. No. 08/625,455.
end for
compute G(x) according to equation (1)
if G* > G(x) do
G* = G(x);
i* = i;
j* = j;
end if
x_ij= max(x_ij,x_ij - B_i/h_ij); /* reset base-stock level */
end if
end for
/* provisionally increase safety stock of every warehouse product and
compute objective function value */
if C_o > B_o do
for j=1 to N_o do
x_oj= min(x_oj^max,x_oj+ B_i/h_oj); /* increase base-stock level */
for i=1 to M and j=1 to N_i do
compute b_ij(x) according to method described commonly owned, co-
pending U.S. patent application Ser. No. 08/625,455.
end for
compute G(x) according to equation (1)
if G* > G(x) do
G* = G(x);
i* = i;
j* = j;
end if
x_oj= max (x_oj, x_oj - B_i/h_oj); /* reset base-stock level */
end for
end if
/* assign new base stock-level to current best product and update
allocable budget values
*/
X_i*j* =x_i*j* +B_i*/h_i*j*;
C_i* = C_i* - B_i*/h_i*j*;
end while
end if
```

Once the processing of the required optimization method is completed, the statistics are updated and results are written to storage and display in output processing routine 38. Exemplary pseudo code for step 38 is shown in Table 7.

TABLE 7

Output Processing:

```
for i=0 to M and j=1 to N_i do
compute b_ij(x) according to method described commonly owned, co-
pending U.S. patent application Ser. No. 08/625,455.
end for
compute G(x) according to equation (1)
for i=0 to M and j=1 to N_i do
send x_ij to output database
send b_ij(x) to output database
end for
sent G(x) to output database
```

It shall be noted that the invention is not limited to production-distribution networks that operate under any one particular inventory control policy. The base-stock control is used solely for illustrative purposes and is not intended as the inventory control policy of choice. It shall also be understood that any inventory control policy, some of which have been listed elsewhere in this document, may be used in conjunction with the method of the present invention.

While the invention has been particularly shown and described with respect to illustrative embodiment using a two-level production-distribution network with base-stock control, it will be understood by those skilled in the art that the foregoing and other changes in form and details may be made therein without departing from the spirit and scope of the invention that should be limited only by the scope of the appended claims.

Having thus described our invention, what we claim as new, and desire to secure by Letters Patent is:

1. A method for estimating stock levels of products in at least one warehouse and in plurality of retail locations of a production-distribution network with inventory control, the method comprising the steps of:

communicating process control parameters and production-distribution network parameters;

computing priorities for each of said products held at said retail locations of said production-distribution network;

allocating available global and local budgets among said products;

setting starting stock levels for each of said products;

selecting a stock level calculation mode;

computing stock levels of products and performance measures of said production-distribution network according to min G(x) where, x is a vector of stock levels $x=(x_{01}, x_{02}, \ldots X_{MN_M})$, subject to a first constraint and a second constraint; and outputting said computed stock levels and performance measures of said production-distribution network to enable optimization of inventories in said production-distribution network.

2. The method of claim 1, wherein said stock levels of products are represented by $$\min G(x) = \sum_{i=1}^{M} \sum_{j=1}^{N_i} s_{ij} b_{ij}(x)$$

where,

M is a number of said retail locations in said production-distribution network, $N_0$ is a number of products at a warehouse, $N_i$ is a number of products at a retail location i, for i=1,2, . . . ,M, and $s_{ij}$ is a shortage cost per unit for product j at said retail location i, i=1,2, . . . ,M and j=1,2, . . . ,$N_i$, $b_{ij}$ (x) is expected number of back orders for product j at said retail location i, i=1,2, . . . ,M and j=1,2, . . . ,$N_i$.

3. The method of claim 2, wherein said first constraint is represented by $x_{ij}^{min} \leq x_{ij} \leq x_{ij}^{max}$ for i=0,1 . . . ,M and j=1,2 . . . ,$N_i$ where $X_{0j}$ is a stock level for product j at said warehouse j, j=1,2, . . . ,$N_0$, $x_{ij}$ is a stock level for product j at said retail location i, i=1,2, . . . ,M and j=1,2, . . . ,$N_i$, $x_{0j}^{min}$ is a minimum stock level for product j at said warehouse j, j=1,2, . . . ,$N_0$, $x_{ij}^{min}$ is a minimum stock level for product j at said retail location i, i=1,2, . . . ,M and j=1,2, . . . ,$N_i$, and $x_{0j}^{max}$ is a maximum stock level for product j at said warehouse j, j=1,2, . . . ,$N_0$, $x_{ij}^{max}$ is maximum stock level for product j at said retail location i, i=1,2, . . . ,M and j=1,2, . . . ,$N_i$.

4. The method of claim 3, further comprising a step of displaying said stock levels of products and performance measures of said production-distribution network.

5. The method of claim 4, wherein the step of computing stock levels of products and performance measures of said production-distribution network in a first mode comprises the steps of:

a. performing steps (a) through (f) until said allocated budget is no longer less than C as presented by said second constraint:

$$0 \leq \sum_{i=0}^{M} \sum_{j=1}^{N_i} c_{ij}(x) \leq C,$$

where $c_{0j}$ (x) is inventory budget allocated to product j at said warehouse, for j=1,2, . . . ,$N_0$, and $c_{ij}$ (x) is inventory budget allocated to product j at said retail location i, for i=1,2, . . . ,M and j=1,2, . . . $N_i$;

b. provisionally increasing said stock level of a selected product with a current highest priority at said retail locations and computing a money value delinquency;

c. iteratively selecting a next product and repeating step (d) until all said products in said warehouse are computed;

d. provisionally increasing said stock level of a selected product at said warehouse and computing a money value delinquency;

e. permanently increasing said stock level of a selected product that yielded a lowest money value delinquency; and f. updating said stock levels, priorities and an allocated budget.

6. The method of claim 4, wherein the step of computing stock levels of products and performance measures of said production-distribution network in a second mode comprises the steps of:

a. performing steps (a) through (g) until said allocated budget for said retailers is no longer less than $C_r$ and said allocated budget for said warehouse is no longer less than $C_0$ as presented by said second constraint:

$$0 \leq \sum_{j=1}^{N_0} c_{0j}(x) \leq C_0 \quad \text{and} \quad 0 \leq \sum_{i=1}^{M} \sum_{j=1}^{N_i} c_{ij}(x) \leq C_r$$

where, $C_0$ is a maximum inventory budget for said warehouse, and $C_r$ denotes a maximum inventory budget for said retailers;

b. provisionally increasing said stock level of a selected product with a current highest priority at said retail locations and computing a money value delinquency if allocated budget for said retailers is less than $C_r$;

c. skipping steps (d) and (e) if said allocated budget for said warehouse is less than $C_0$;

d. iteratively selecting a next product and repeating step (e) until all said products in said warehouse are computed;

e. provisionally increasing said stock level of a selected product at said warehouse and computing a money value delinquency;

f. permanently increasing said stock level of a selected product that yielded a lowest money value delinquency; and g. updating said stock levels, priorities and an allocated budget.

7. The method of claim 4, wherein the step of computing stock levels of products and performance measures of said production-distribution network in a third mode comprises the steps of:

a. performing steps (a) through (g) until a maximum inventory budget for a current retailer is no longer less than $C_i$ as presented by said second constraint:

$$0 \leq \sum_{j=1}^{N_i} c_{ij}(x) \leq C_i, \quad \text{for} \quad i = 0, 1, \ldots, M,$$

where, $C_0$ is a maximum inventory budget for said warehouse, and $C_i$ is a maximum inventory budget for said retail location i, i=1,2, . . . ,M;

b. provisionally increasing said stock level of a selected product with a current highest priority at said retail locations and computing a money value delinquency if said maximum inventory budget is less than $C_i$ for a current retailer;

c. iteratively selecting a next product and repeating steps (d) and (e) until all said products in said warehouse are computed;

d. skipping step (e) if said allocated budget for said warehouse is less than $C_0$;

e. provisionally increasing said stock level of a selected product at said warehouse and computing a money value delinquency;

f. permanently increasing said stock level of a selected product that yielded a lowest money value delinquency; and g. updating said stock levels, priorities and an allocated budget.

8. A computer program device readable by a machine, tangibly embodying a program of instructions executable by a machine to perform method steps for estimating stock levels of products in at least one warehouse and in plurality of retail locations of a production-distribution network with inventory control, the method comprising the steps of:

communicating process control parameters and production-distribution network parameters;

computing priorities for each of said products held at said retail locations of said production-distribution network;

allocating available global and local budgets among said products;

setting starting stock levels for each of said products;

selecting a stock level calculation mode;

computing stock levels of products and performance measures of said production-distribution network according to min G(x) where, x is a vector of stock levels $x=(x_{01}, x_{02}, \ldots x_{MN_M})$, subject to a first constraint and a second constraint; and outputting said computed stock levels and performance measures of said production-distribution network to enable optimization of inventories in said production-distribution network.

9. The computer program device readable by a machine as claimed in claim 8, wherein said stock levels of products is represented by $$\min G(x) = \sum_{i=1}^{M} \sum_{j=1}^{N_i} s_{ij} b_{ij}(x)$$

where,

M is a number of said retail locations in said production-distribution network, $N_0$ is a number of products at a warehouse, $N_i$ is a number of products at a retail location i, for $i=1,2,\ldots,M$, and $s_{ij}$ is a shortage cost per unit for product j at said retail location i, $i=1,2,\ldots,M$ and $j=1,2,\ldots,N_i$, $b_{ij}(x)$ is expected number of back orders for product j at said retail location i, $i=1,2,\ldots,M$ and $j=1,2,\ldots,N_i$.

10. The computer program device readable by a machine as claimed in claim 9, wherein said first constraint is represented by $x_{ij}^{min} \leq x_{ij} \leq x_{ij}^{max}$ for $i=0,1\ldots,M$ and $j=1,2\ldots,N_i$ where $x_{0j}$ is a stock level for product j at said warehouse j, $j=1,2,\ldots,N_0$, $x_{ij}$ is a stock level for product j at said retail location i, $i=1,2,\ldots,M$ and $j=1,2,\ldots,N_i$, $x_{0j}^{min}$ is a minimum stock level for product j at said warehouse j, $j=1,2,\ldots,N_0$, $x_{ij}^{min}$ is a minimum stock level for product j at said retail location i, $i=1,2,\ldots,M$ and $j=1,2,\ldots,N_i$, and $x_{0j}^{max}$ is a maximum stock level for product j at said warehouse j, $j=1,2,\ldots,N_0$, $x_{ij}^{max}$ is maximum stock level for product j at said retail location i, $i=1,2,\ldots,M$ and $j=1,2,\ldots,N_i$.

11. The computer program device readable by a machine as claimed in claim 10, further comprising a step of displaying said stock levels of products and performance measures of said production-distribution network.

12. The computer program device readable by a machine as claimed in claim 11, wherein the step of computing stock levels of products and performance measures of said production-distribution network in a first mode comprises the steps of:

a. performing steps (a) through (f) until said allocated budget is no longer less than C as presented by said second constraint:

$$0 \leq \sum_{i=0}^{M} \sum_{j=1}^{N_i} c_{ij}(x) \leq C,$$

where $c_{0j}(x)$ is inventory budget allocated to product j at said warehouse, for $j=1,2,\ldots,N_0$, and $c_{ij}(x)$ is inventory budget allocated to product j at said retail location i, for $i=1,2,\ldots,M$ and $j=1,2,\ldots N_i$;

b. provisionally increasing said stock level of a selected product with a current highest priority at said retail locations and computing a money value delinquency;

c. iteratively selecting a next product and repeating step (d) until all said products in said warehouse are computed;

d. provisionally increasing said stock level of a selected product at said warehouse and computing a money value delinquency;

e. permanently increasing said stock level of a selected product that yielded a lowest money value delinquency; and f. updating said stock levels, priorities and an allocated budget.

13. The computer program device readable by a machine as claimed in claim 12, wherein the step of computing stock levels of products and performance measures of said production-distribution network in a second mode comprises the steps of:

a. performing steps (a) through (g) until said allocated budget for said retailers is no longer less than $C_r$ and said allocated budget for said warehouse is no longer less than $C_0$ as presented by said second constraint:

$$0 \leq \sum_{j=1}^{N_0} c_{0j}(x) \leq C_0 \quad \text{and} \quad 0 \leq \sum_{i=1}^{M} \sum_{j=1}^{N_i} c_{ij}(x) \leq C_r$$

where, $C_0$ is a maximum inventory budget for said warehouse, and $C_r$ denotes a maximum inventory budget for said retailers;

b. provisionally increasing said stock level of a selected product with a current highest priority at said retail locations and computing a money value delinquency if allocated budget for said retailers is less than $C_r$;

c. skipping steps (d) and (e) if said allocated budget for said warehouse is less than $C_0$;

d. iteratively selecting a next product and repeating step (e) until all said products in said warehouse are computed;

e. provisionally increasing said stock level of a selected product at said warehouse and computing a money value delinquency;

f. permanently increasing said stock level of a selected product that yielded a lowest money value delinquency; and g. updating said stock levels, priorities and an allocated budget.

14. The computer program device readable by a machine as claimed in claim 13, wherein the step of computing stock levels of products and performance measures of said production-distribution network in a third mode comprises the steps of:

a. performing steps (a) through (g) until a maximum inventory budget for a current retailer is no longer less than $C_i$ as presented by said second constraint:

$$0 \le \sum_{j=1}^{N_i} c_{i,j}(x) \le C_i, \quad \text{for} \quad i = 0, 1, \ldots, M,$$

where, $C_0$ is a maximum inventory budget for said warehouse, and $C_i$ is a maximum inventory budget for said retail location i, i=1,2, . . . ,M;

b. provisionally increasing said stock level of a selected product with a current highest priority at said retail locations and computing a money value delinquency if said maximum inventory budget is less than $C_i$ for a current retailer;

c. iteratively selecting a next product and repeating steps (d) and (e) until all said products in said warehouse are computed;

d. skipping step (e) if said allocated budget for said warehouse is less than $C_0$;

e. provisionally increasing said stock level of a selected product at said warehouse and computing a money value delinquency;

f. permanently increasing said stock level of a selected product that yielded a lowest money value delinquency; and g. updating said stock levels, priorities and an allocated budget.

* * * * *

UNITED STATES PATENT AND TRADEMARK OFFICE
CERTIFICATE OF CORRECTION

PATENT NO. : 6,078,900  
DATED : June 20, 2000  
INVENTOR(S) : Markus Ettl, et al.

It is certified that error appears in the above-identified patent and that said Letters Patent is hereby corrected as shown below:

Title page:  
[56] References cited, OTHER PUBLICATIONS: Both instances of "41" should be italicized. "163-281" should read -- 263-281 --.

Column 9,  
Table 4: "j*=0:" should read -- j*=0; --.

Column 11,  
Table 5: "provisionallyincreas" should read -- provisionally increase --.

Claims:  
Column 15,  
Line 9, claim 3, "c $x_{ij}$ c•" should read -- £•$x_{ij}$ £--.

Column 17,  
Line 42, claim 10, "c $x_{ij}$ c•" should read -- £•$x_{ij}$ £--.

Signed and Sealed this

Twenty-seventh Day of November, 2001

*Attest:*

Nicholas P. Godici

NICHOLAS P. GODICI  
*Attesting Officer*   *Acting Director of the United States Patent and Trademark Office*